United States Patent [19]

Patino et al.

[11] Patent Number: 5,331,268

[45] Date of Patent: Jul. 19, 1994

[54] METHOD AND APPARATUS FOR DYNAMICALLY CHARGING A BATTERY

[75] Inventors: Joseph Patino, Plantation; Daniel M. Nigro, Lauderhill; John D. Fiske, II, Pompano Beach, all of Fla.

[73] Assignee: Motorola, Inc., Schaumburg, Ill.

[21] Appl. No.: 100,235

[22] Filed: Aug. 2, 1993

[51] Int. Cl.⁵ .............................................. H02J 7/04
[52] U.S. Cl. ...................................... 320/20; 320/22; 320/39
[58] Field of Search .................. 320/20, 21, 22, 23, 320/24, 39, 40, 43, 44

[56] References Cited

U.S. PATENT DOCUMENTS

| | | | |
|---|---|---|---|
| 3,733,534 | 5/1973 | Saslow | 320/23 |
| 3,895,283 | 7/1975 | Peterson | 320/39 X |
| 3,917,990 | 11/1975 | Sherman, Jr. | 320/22 X |
| 4,006,396 | 2/1977 | Bogut | 320/22 X |
| 4,354,148 | 10/1982 | Tada et al. | 320/20 |
| 4,467,265 | 8/1984 | Hierholzer, Jr. | 320/20 |
| 4,670,703 | 6/1987 | Williams | 320/22 |
| 4,673,861 | 6/1987 | Dubovsky et al. | 320/2 |
| 5,115,182 | 5/1992 | Ehmke et al. | 320/22 X |
| 5,122,722 | 6/1992 | Goedken et al. | 320/22 |
| 5,130,634 | 7/1992 | Kasai | 320/22 |
| 5,157,320 | 10/1992 | Kuriloff | 320/39 |

*Primary Examiner*—Kristine L. Peckman
*Attorney, Agent, or Firm*—Pedro P. Hernandez

[57] ABSTRACT

A charger (302) determines the voltage baseline of a battery (306) and establishes a voltage range based on the voltage baseline of battery (306). Once the rapid charge rate has terminated and the trickle charge rate commenced, charger (302) monitors the voltage of the battery in order to make sure the battery is not being depleted. If the battery voltage is above the established range, the trickle charge rate is decreased, and if the battery voltage is below the voltage range, the trickle charge rate is increased.

9 Claims, 4 Drawing Sheets

METHOD AND APPARATUS FOR DYNAMICALLY CHARGING A BATTERY

TECHNICAL FIELD

This invention relates in general to battery chargers, and more specifically to a battery charger which provides for a dynamically adaptive charge rate.

BACKGROUND

Battery chargers which are used to charge two-way radio batteries typically charge the rechargeable battery at a fast charge rate for a certain period of time and then revert to a slower charge rate (trickle charge rate) for as long as the battery remains in the charger. The charger reverts to the trickle charge rate after determining that the change in temperature of the battery has reached a certain change in temperature over a predetermined period of time ($\Delta T$). This is done to protect the battery from overheating, since the battery at this specific point is almost fully charged. A second method used by prior art chargers to decide when to revert from the fast charge rate to the trickle rate mode is by monitoring the voltage of the battery and reverting to that mode upon a predetermined voltage slope is reached ($\Delta V$).

Referring now to FIG. 1, there is shown a prior art battery charging routine. In step 102, the battery is inserted into the charger. The charger in step 104 then determines the charge capacity of the battery by sensing the resistance of a capacity resistor ($R_c$) corresponding to the capacity of the battery as is well known in the art. The capacity resistor ($R_c$) is located in the battery itself. Also, the temperature of the battery is sensed by sensing the resistance (by determining the voltage developed by the resistance) of a thermistor which is also located inside of the battery. If the measurements taken in step 104 are determined to be satisfactory, the charge sequence is enabled. If the values measured are not within predetermined parameters, the charger goes to step 108, where the charger indicates a fault condition. The charger user is informed of the fault condition by lighting up a fault condition light emitting diode (LED) located on the charger.

In step 110, the rapid charge sequence is begun. In step 112, the charger monitors the $\Delta T$ (temperature slope) of the battery to determine if the rapid charge rate is to be discontinued. Instead of monitoring for changes in $\Delta T$, the charger could monitor for changes in $\Delta V$, waiting until the slope becomes negative for $\Delta V$, which indicates that the battery is charged. If the $\Delta T$ of the battery as determined by the charger reaches a predetermined value, the rapid charge sequence is stopped, in order to prevent overheating of the battery. The charger is then placed in a trickle charge mode in step 114. In the trickle mode the battery is charged at a rate of approximately C/10 to C/20, were "C" is the capacity of the battery. For example, if the battery has a capacity of 1000 milliampere-hour (maH) at a C/10 charge rate, the charger would charge the battery using a current of 100 ma.

Prior art chargers have a problem with users who leave their radios on and attached to the batteries, when the batteries are being charged. This is especially true for users who use the radio/charger combination as a desk top base station and transmit with the radio in the charger. In these particular cases, the amount of charge going into the battery in the trickle charge mode is less than the amount of charge being used by the radio in the stand-by mode. The battery charge depletion rate worsens if the radio begins to receive a message, or if the radio is used to transmit while still in the charger. This causes problems for users who think that their batteries are charged after being in the charger for a predetermined period of time, when in reality, in some conditions, the batteries are more depleted than when they were first inserted into the charger. In worst case scenarios, if the batteries are left in the charger long enough under the conditions previously mentioned, the batteries can become completely discharged, while the charger is still identifying to the user that the battery is fully charged.

Table 1 below shows the length of time under different conditions in which a battery will become completely discharged even while in a charger. Table 1 assumes that during a radio transmit condition, the radio which is attached to the battery under charge draws 2.1 amperes, during receive the current draw is 210 milliamps, and during standby the current draw is 70 milliamps. Part (a) assumes the radio is transmitting for 5% of the time, 5% it is receiving, and 90% it is in the standby mode. Parts (b) and (c) assume different ratios. As can be seen from the data presented in table 1, even after the charger has completed its rapid charge mode which places the battery in an almost fully charged condition, if a radio which is turned on is attached to the battery, charge depletion of the battery occurs. For example, if the battery has a 1200 maH capacity, and a 5/5/90 operational duty cycle is assumed for the radio, in approximately 9.6 hours the battery will be fully depleted, even given the trickle charge rate of 55 ma.

TABLE 1

| Capacity | trickle rate | net current | Time |
|---|---|---|---|
| (a). 5/5/90 duty cycle load = 180 mA | | | |
| 900 MAH | 55 mA | (125 ma) | 7.2 hrs |
| 1200 MAH | 55 mA | (125 mA) | 9.6 hrs |
| 1800 MAH | 90 mA | (90 mA) | 20 hrs |
| (b). 10/10/80 duty cycle load = 287 mA | | | |
| 900 MAH | 55 mA | (232 ma) | 3.9 hrs |
| 1200 MAH | 55 mA | (232 mA) | 5.2 hrs |
| 1800 MAH | 90 mA | (197 mA) | 9.1 hrs |
| (c). 0/20/80 duty cycle load = 98 mA | | | |
| 900 MAH | 55 mA | (43 ma) | 20.9 hrs |
| 1200 MAH | 55 mA | (43 mA) | 27.9 hrs |
| 1800 MAH | 90 mA | (8 mA) | 9.4 days |

A need thus exists for a battery charger which can maintain the battery within a predetermined charge level even if the battery charge is being depleted as mentioned previously. Also, a need exists for a method of charging a battery which provides for better charging of the battery based on the individual characteristics of the battery being charged, thereby helping to extend the useful life of the battery.

DETAILED DESCRIPTION OF THE PREFERRED EMBODIMENT

Figure 1:
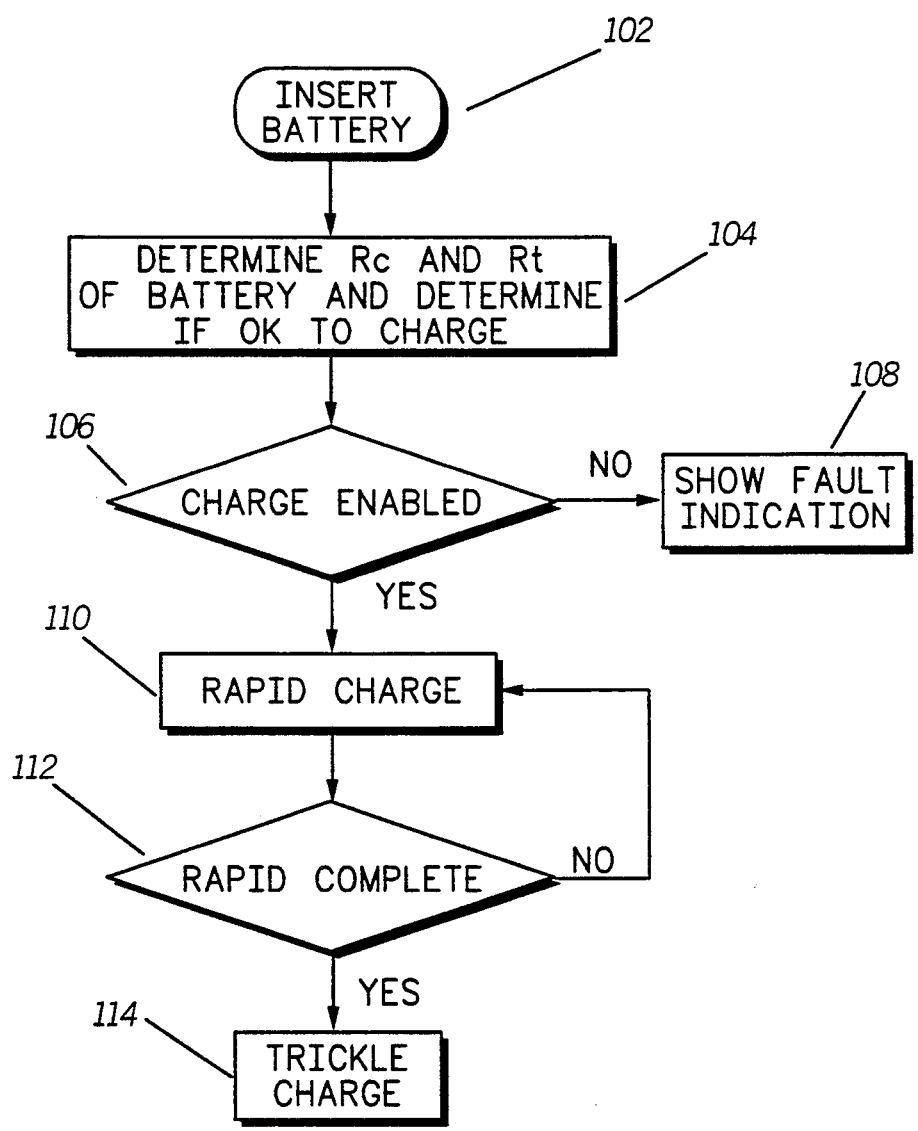
FIG. 1 is a flow chart of the operation of a prior art battery charger.

While the specification concludes with claims defining the features of the invention that are regarded as novel, it is believed that the invention will be better understood from a consideration of the following description in conjunction with the drawing figures, in which like reference numerals are carried forward.

Figure 2:
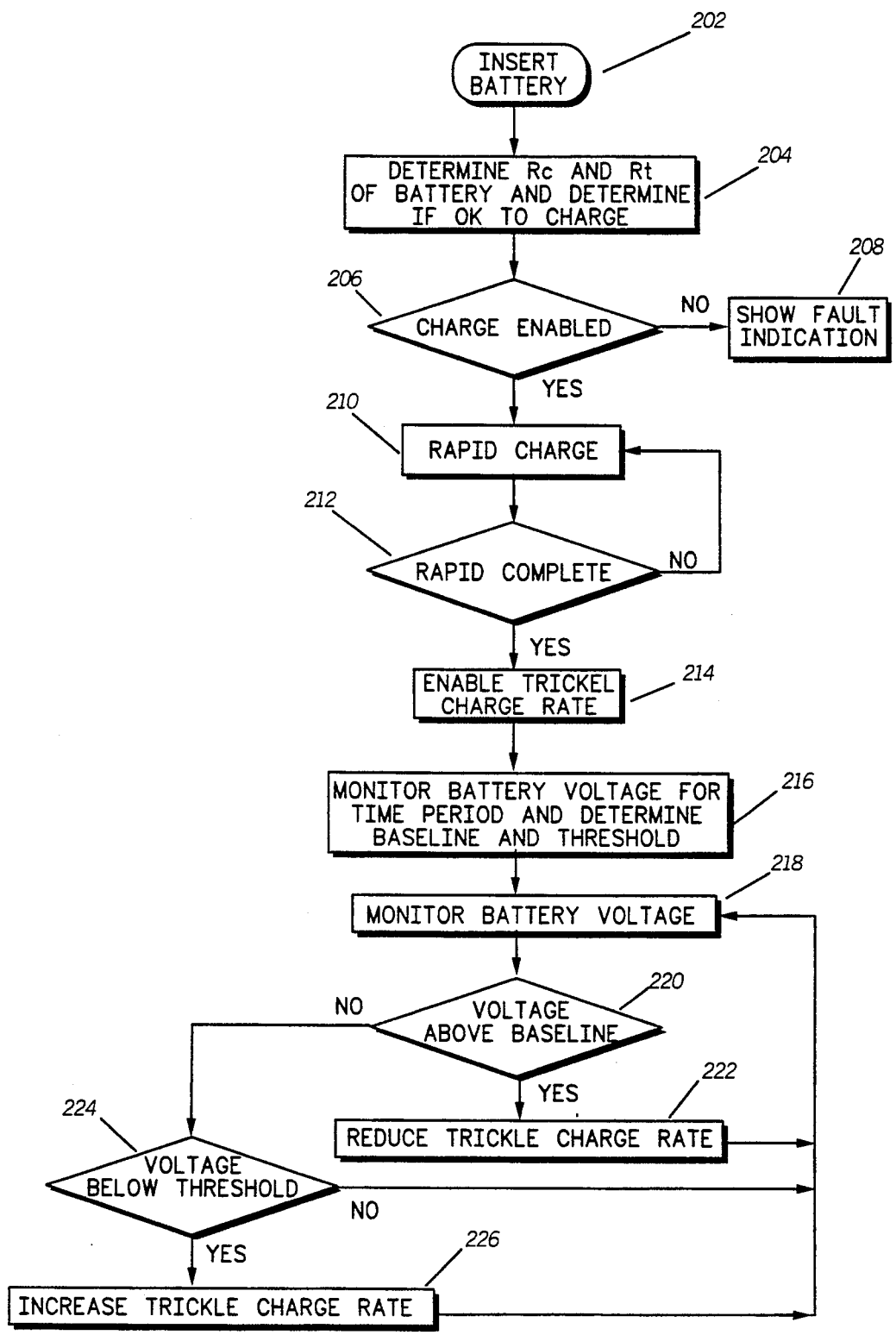
FIG. 2 is a flow chart showing the operation of a battery charger in accordance with the present invention.

Referring now to FIG. 2, a flow chart showing a typical battery charge sequence in accordance with the present invention is shown. Steps 202-214 in FIG. 2 are similar to steps 102-114 which were discussed in relation to FIG. 1. Unlike the charging routine discussed with respect to FIG. 1, once the charger enters the trickle charge rate in the present invention, in step 216, the charger determines the dynamic baseline voltage and threshold limits for the battery that is being charged. The present invention monitors the B+ voltage of the battery for a predetermined period of time in order to calculate the dynamic baseline voltage.

The dynamic trickle charge baseline voltage of the battery is the voltage at a given trickle charge rate that the battery sustains when fully charged. This baseline voltage changes if the trickle charge rate is changed to a given extent. For example, at a trickle charge rate of C/10, the baseline voltage would be slightly higher than at a trickle charge rate of C/20. This is due to the additional voltage drop caused by the added current with that particular battery impedance. This change in dynamic baseline voltage will be limited to an extent in that if too much trickle charge current is applied to the battery, the battery begins to overheat, and the baseline voltage actually drops. The dynamic baseline voltage changes over the life of a battery due to battery cell aging. The actual method of calculating the dynamic baseline voltage of the battery will be discussed in full detail later on. By knowing the dynamic baseline voltage of the battery to be charged, the charger can make sure not to attempt to charge the battery for too long above this voltage in order to protect the battery from overheating and thereby prevent damaging the battery.

After the baseline voltage of the battery is determined by the charger, the charger establishes a voltage range comprising the baseline voltage as the upper limit and a lower limit by subtracting a predetermined voltage from the baseline voltage (e.g., 0.6 volts). In step 220, the charger determines if the battery B+ voltage is above the established baseline voltage, if it is, the trickle charge rate to the battery is reduced. If the voltage of the battery is below the baseline voltage, the routine moves to step 224. In step 224, the charger determines if the battery voltage is below the lower limit. If the battery voltage is below the lower voltage limit, the charger increases its trickle charge rate in step 226. By determining the unique dynamic baseline voltage of the battery and establishing a voltage range in which to maintain the battery in, the battery can be maintained within a predetermined charge percentage, while making sure that the battery is not overheated by charging the battery with too much current. Since each batteries baseline voltage is uniquely based on the battery's age, number of recharges it has gone through, etc., the present invention in a way tailors the charge sequence of the battery based on the batteries present operational condition and provides for a better charging routine.

Figure 3:
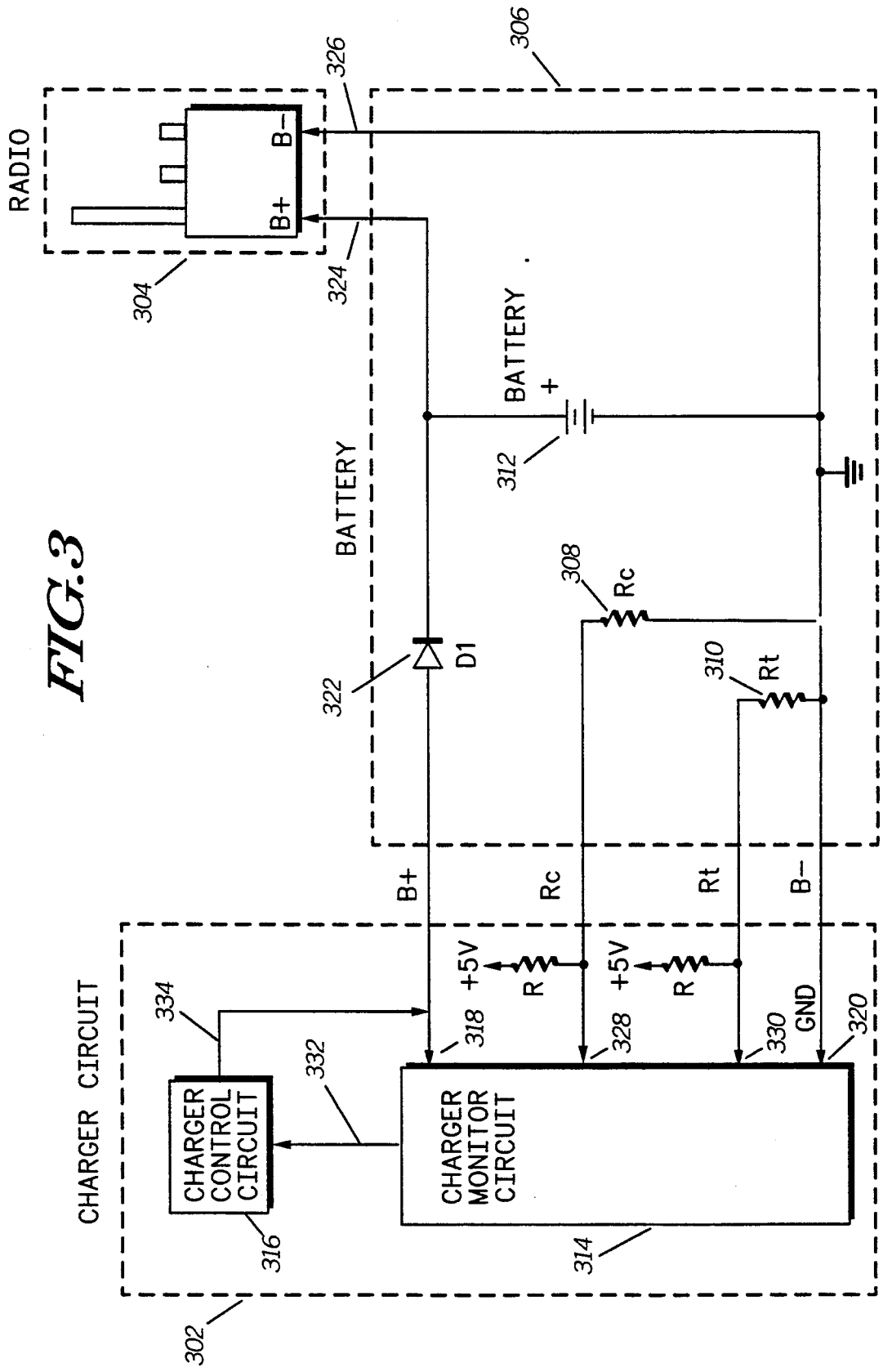
FIG. 3 is a block diagram of a charger system in accordance with the invention.

Referring to FIG. 3, there is shown a battery charging system consisting of a charger 302, radio battery 306 and radio 304. Radio 304 contains positive (B+) and negative (B−) battery terminals which are coupled to radio battery 306 via battery contacts 324 and 326, respectively. Battery 306 contains one or more battery cells 312, which determine the voltage and current capacity of battery 306. Also included as part of battery 306, are a protection diode 322, a battery temperature indicator such as thermistor ($R_t$) 310 and a battery capacity indicator, such as capacity resistor ($R_c$) 308.

Charger 302 consists of a charger monitor circuit 314, which can consist of a well known microprocessor or microcontroller such as a M68HC11xx family of microprocessor or other well known controller as known in the art. The microprocessor preferably contains on-board storage sections such as RAM, ROM and EEPROM, were the appropriate control software in accordance with the invention resides. Charger monitor circuit 314 controls a charging means such as a charger control circuit 316 which provides current to battery 306 in order to charge the battery. Charger control circuit acts as a programmable current source, providing the amount of current indicated by charger monitor circuit 314 to battery 306. A control signal is transmitted by charger monitor circuit 314 to charger control circuit 316 via bus 332, the control signal informs charger control circuit 316 how much current to source via line 334 to battery 306.

Charger monitor circuit 314 contains three analog to digital (A/D) ports 318, 328 and 330. A/D port 318 monitors the voltage on the B+ line and therefore acts as a battery voltage monitoring means. A/D port 328 senses the resistance of capacity resistor Rc 308 and A/D port 330 senses the resistance of thermistor $R_t$ 310, as ithe thermistor's resistance changes once the battery begins charging due to heating. A/D ports 328 and 330 include external pull-up resistors which are used to determine the resistance of $R_c$ 308 and $R_t$ 310, by determining the voltage level at A/D ports 328 and 330, respectively.

Figure 4:
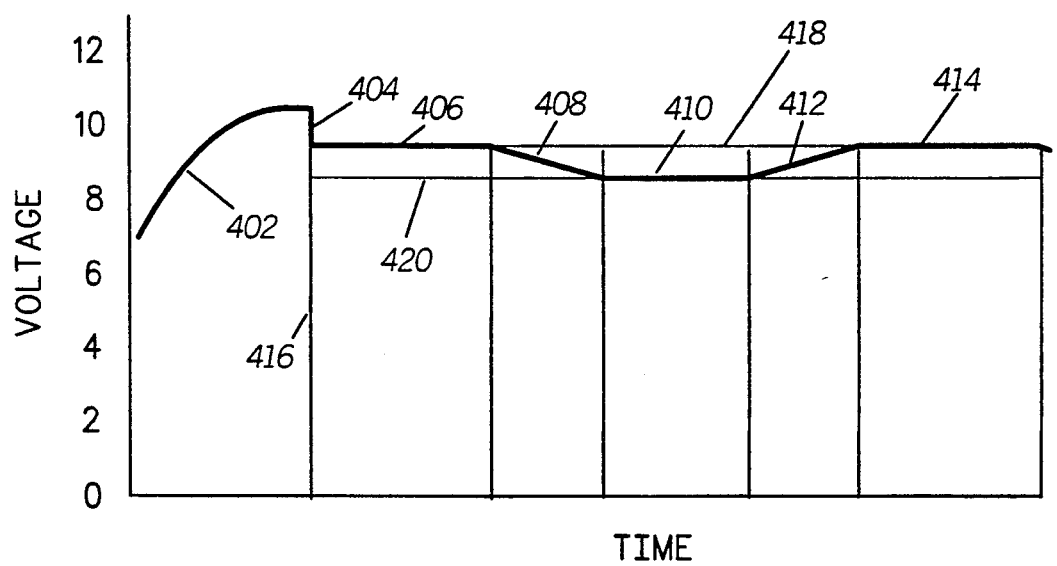
FIG. 4 is a curve showing the battery voltage of a battery under charge in accordance with the present invention.

FIG. 4 depicts the battery voltage of a typical battery being rapid charged and then maintained by the adaptive trickle charge sequence of the present invention. The graph shows how the trickle rate is increased because of an applied load being placed on the battery (e.g. radio is unsquelched during battery charging), and how once the voltage is returned to the baseline voltage how the charge current is reduced to maintain the battery at the baseline voltage and avoid overheating the battery by attempting to charge the battery above the base line voltage. During period 402, battery 306 is rapid charged (first charge rate) by charger 302. During sequence 402, the battery is typically charged at a rate of "C" which is the capacity of the battery per hour. (e.g., a 1000 maH battery would be rapid charged at 1000 ma).

Once charger monitor circuit 314 determines that the ΔT (change in temperature of battery 306) has reached a predetermined rate (in the preferred embodiment, this rate is set at a change of 1.8 degrees Celsius over a 3 minute period), the rapid charge rate is terminated at time 416 and the trickle charge rate (second charge rate)is begun. During period 404, the voltage of the battery drops to its dynamic baseline voltage 418 at the given trickle charge rate (second charge rate which is lower than the rapid rate). During period 406, charger monitor circuit 314 monitors the B+ voltage of battery 306 and acts as a means for determining the dynamic baseline voltage of battery 306 in order to sense the baseline voltage of the battery and store the voltage level. A/D input 318 converts the voltage of battery 306 into a digital word and several of such words are preferably sampled over a given time frame by monitor circuit 314 in order to get a good read of the dynamic baseline voltage. Time period 406 should be long enough for monitor circuit 314 to be able to take several readings of the battery B+ line 318. A good time period for determining the base line voltage is approximately 10 seconds. However, in environments were radios are left on while the battery is being charged, and the environment is prone to cause the radios to unsquelch, a longer period may be required in order to get a better determination of the baseline voltage. By taking several readings of the battery voltage a better guarantee can be had of getting the actual baseline voltage for battery 306. This baseline voltage represents that battery's ideal baseline voltage to maintain its full capacity.

Once the base line or normal B+ voltage is determined, then a standard voltage drop from that of 0.6 volts in the preferred embodiment will be subtracted from the baseline to determine the lower or minimum charging threshold. This means for establishing the voltage range is performed by monitor circuit 314 by preferably using control software stored in monitor circuit 314. The baseline voltage 418 becomes the upper threshold and the lower threshold 420 is set by subtracting a predetermined voltage from the baseline voltage. Thus, by using the baseline B+ voltage minus a predetermined allowable voltage drop (in this example 0.6 V) which is preferably stored in the storage section of monitor circuit 314, the charger can assure that the battery is kept within 95% of full capacity in the preferred embodiment. The predetermined amount of voltage level subtracted can be a variable amount based on the determined baseline voltage or it can be a fixed amount (e.g., 0.6 V for all batteries. If the charger charges only one type of rechargeable battery, then one can get away with using a fixed voltage for determining lower threshold 420.

The amount of voltage which is subtracted from the dynamic baseline voltage in order to determine the lower voltage threshold for the voltage range will determine how far from being fully charged, the battery will become, before a change in the charging current occurs. In table 2, a practical example of a fully charged battery (of approximately 900 maH capacity) having a fully charged voltage of 9.2 volts and the charger trickle charging the battery at approximately 60 ma and having an external load of 205 ma which will discharge the battery in 372 minutes shows that:

TABLE 2

(Example #1) Battery voltage after 18 minutes of load placed=8.6 V; yielding a ΔV which equals=0.6 V and a total discharge percentage of 18/372<5%

(Example #2) Battery voltage after 36 minutes of load placed=8.4 V; yielding a Δ of 0.8 V and a total discharge percentage of 36/372<10%

(Example #3) Battery voltage after 60 minutes of load placed=8.3 V; yielding a Δ of 0.9 V and a total discharge percentage of 60/372=15%

If the voltage range between the upper threshold limit (dynamic voltage level) and the lower threshold limit is set at 0.6 volts then the battery is assured of 5% maximum depletion, before the present invention begins to compensate for the charge depletion. If the voltage range is equal to 0.8 volts then the battery is assured of 10% maximum depletion, while at a 0.9 volt range, the battery is assured of 15% maximum depletion before the battery charger changes the charge current in accordance with the invention. The amount of voltage drop used for establishing the lower limit of the voltage range will depend on many factors including, the charge capacity of batteries being used, the load the batteries are presented with while being charged by the charger, the trickle charge rate used, etc. Preferably, charger monitor circuit will have several voltage drop levels and will select one based on the charge capacity of the battery as determined by the measurement of Rc 308, or anyone of a number of other factors. In this way, the charger can be customized even further based on battery capacity, etc.

Portion 408 shows the voltage of the battery during a period of time that a load is applied to the battery that is depleting more current than the charger is providing. During period 410, charger monitor circuit 314 determines that the voltage of battery 306 has reached the lower threshold by monitoring the B+ line via port 318 and the charger control circuit 316 begins to provide more trickle charge current to battery 306 by a command word sent by monitor circuit 314. The amount of charge current increase will be gradual and will be increased if the voltage of the battery keeps dropping below the threshold. The amount of change in the trickle charge rate supplied to battery 306 will preferably depend on the slope of voltage during period 408. Since this will give a good indication of the load which is being presented to battery 306, and will allow for monitor circuit 314 to be able to adequately compensate for the battery charge depletion. During period 412, the load which had been applied to the battery has been removed, and the battery begins to regain its lost charge. Finally, in period 414, the charger monitor circuit 314 determines that the battery has reached upper threshold 418 (battery baseline voltage) and the charger maintains its standard trickle charge rate to maintain the battery topped-off.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

In summary, the present charging scheme determines a different baseline voltage for each battery that is to be charged, and the trickle charging rate of the charger is dynamically maintained at an optimum rate based on the battery condition. For example, the charger of the present invention can cutback its charge rate to avoid overcharging the battery or it can increase its charge rate to the battery in order to avoid loss of battery charge in the case of an active radio being attached to the battery while it is being charge. The present invention maintains the battery voltage between a predetermined voltage range which is based on the unique baseline voltage of the battery under charge. This provides for a better charging scheme which maintains the battery as close to its baseline voltage, while not overheating the battery.

What is claimed is:

1. A method for dynamically charging a battery having a voltage, comprising the steps of:

determining a dynamic baseline voltage for the battery after the battery has been charged for a predetermined period of time;

establishing a voltage range based on the dynamic baseline voltage;

charging the battery at a predetermined charge rate;

monitoring the voltage of the battery; and adjusting the rate at which the battery is being charged if the voltage of the battery falls outside of the voltage range.

2. A method for dynamically charging a battery as defined in claim 1, wherein the step of establishing a voltage range, comprises the steps of:

using the dynamic baseline voltage as an upper threshold of the voltage range; and subtracting a predetermined voltage amount from the dynamic baseline voltage in order to determine a lower threshold of the voltage range.

3. A method for dynamically charging a battery as defined in claim 1, wherein the step of determining the dynamic baseline voltage, comprises the sub-steps of:

determining that the battery has been charged to a predetermined level; and measuring the voltage of the battery a plurality of times.

4. A method for dynamically charging a battery as defined in claim 2, wherein the step of adjusting the rate at which the battery is being charged, comprises the steps of:

lowering the charge rate if the voltage of the battery is higher than the upper threshold; and increasing the charge rate if the voltage of the battery is lower than the lower threshold.

5. A method for dynamically charging a battery as defined in claim 3, wherein the step of determining that the battery has been charged to a predetermined level further comprises:

determining that the change in temperature of the battery over a certain time period equals a predetermined value.

6. A battery charger for charging a battery having a voltage, comprising:

a charging means for charging the battery:

a controller coupled to the charging means, comprising:

means for monitoring the voltage of the battery;

means for determining a dynamic baseline voltage for the battery after the battery has been charged for a predetermined period of time by the charging means;

means for establishing a voltage range based on the dynamic baseline voltage of the battery; and the controller further comprises a means for adjusting the rate at which the battery is being charged by the charging means if the voltage of the battery falls outside of the voltage range.

7. A battery charger for charging a battery as defined in claim 6, wherein the means for adjusting the rate at which the battery is being charged increases the rate at which the charging means charges the battery if the means for monitoring the voltage of the battery determines that the voltage of the battery is below the voltage range and decreases the rate at which the charging means charges the battery if the means for monitoring the voltage of the battery determines that the voltage of the battery is above the voltage range.

8. A battery charger for charging a battery as defined in claim 6, wherein the controller further comprises a storage means for storing a voltage level; and the means for establishing a voltage range uses the dynamic baseline voltage as an upper threshold level of the voltage range and subtracts the voltage level stored in the storage means from the dynamic baseline voltage in order to establish a lower threshold level of the voltage range.

9. A battery charger for charging a battery as defined in claim 6, wherein the controller is a microprocessor.

* * * * *